United States Patent
Lin

(10) Patent No.: US 8,606,059 B1
(45) Date of Patent: Dec. 10, 2013

(54) OPTICAL FIBER CONNECTOR WITH SHIELDING MEMBER

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/562,302

(22) Filed: Jul. 30, 2012

(30) Foreign Application Priority Data

May 16, 2012 (TW) .............................. 101117295 A

(51) Int. Cl.
  *G02B 6/00* (2006.01)
  *G02B 6/36* (2006.01)
  *G02B 6/38* (2006.01)

(52) U.S. Cl.
  USPC .............................................. 385/33; 385/74

(58) Field of Classification Search
  USPC ......... 385/31, 32, 33, 34, 39, 147, 88–90, 24; 250/227, 216
  See application file for complete search history.

(56) References Cited

U.S. PATENT DOCUMENTS

| 4,681,398 | A * | 7/1987 | Bailey et al. ................... 385/79 |
| 4,822,130 | A * | 4/1989 | Maranto et al. ............... 385/138 |
| 7,850,373 | B2 * | 12/2010 | Ishigami et al. ............... 385/92 |
| 8,403,575 | B2 * | 3/2013 | Gocho ............................ 400/76 |
| 8,408,812 | B2 * | 4/2013 | Lin ................................ 385/70 |
| 2002/0028048 | A1 * | 3/2002 | Dair et al. ...................... 385/92 |
| 2011/0164851 | A1 * | 7/2011 | Ishigami ........................ 385/93 |
| 2011/0249171 | A1 * | 10/2011 | Shigemitsu et al. .......... 348/340 |

\* cited by examiner

*Primary Examiner* — Akm Enayet Ullah
(74) *Attorney, Agent, or Firm* — Altis Law Group, Inc.

(57) ABSTRACT

An optical fiber connector includes a first transmission member, a second transmission member engaged with the first transmission member, and an elongated shielding member. The first transmission member includes a first body and two lenses. The first body includes an upper surface, a lower surface parallel to the upper surface, and a front surface connecting the upper surface to the lower surface. A recess is defined in the upper surface and exposed at the front surface. The first body includes a first light coupling surface and a sealing surface in the recess. The second transmission member includes a second body having a second light coupling surface facing the first light coupling surface. The shielding member is fixed on the upper surface above the recess. The shielding member cooperates with the two light receiving surfaces, and the sealing surface to form a sealed room for receiving the two lenses.

11 Claims, 6 Drawing Sheets

OPTICAL FIBER CONNECTOR WITH SHIELDING MEMBER

BACKGROUND

1. Technical Field

The present disclosure relates to optics and, particularly, to an optical fiber connector having a shielding member.

2. Description of Related Art

Two optical fiber connectors are coupled together for data transmission between electronic devices due to their high transmission speed and signal integrity. Each optical fiber connector includes a number of lenses and a number of optical fibers. When the optical fiber connector is assembled, the optical fibers are aligned with the lenses to ensure the optical transmittance. However, a gap is formed between the lenses and the corresponding optical fibers. Therefore, the lenses are easily broken and contaminated from exposure to the external environment. This decreases transmission efficiency and degrades signal integrity.

Therefore, it is desirable to provide an optical fiber connector having a shielding member, which can overcome or at least alleviate the limitations described.

DETAILED DESCRIPTION

Figure 1:
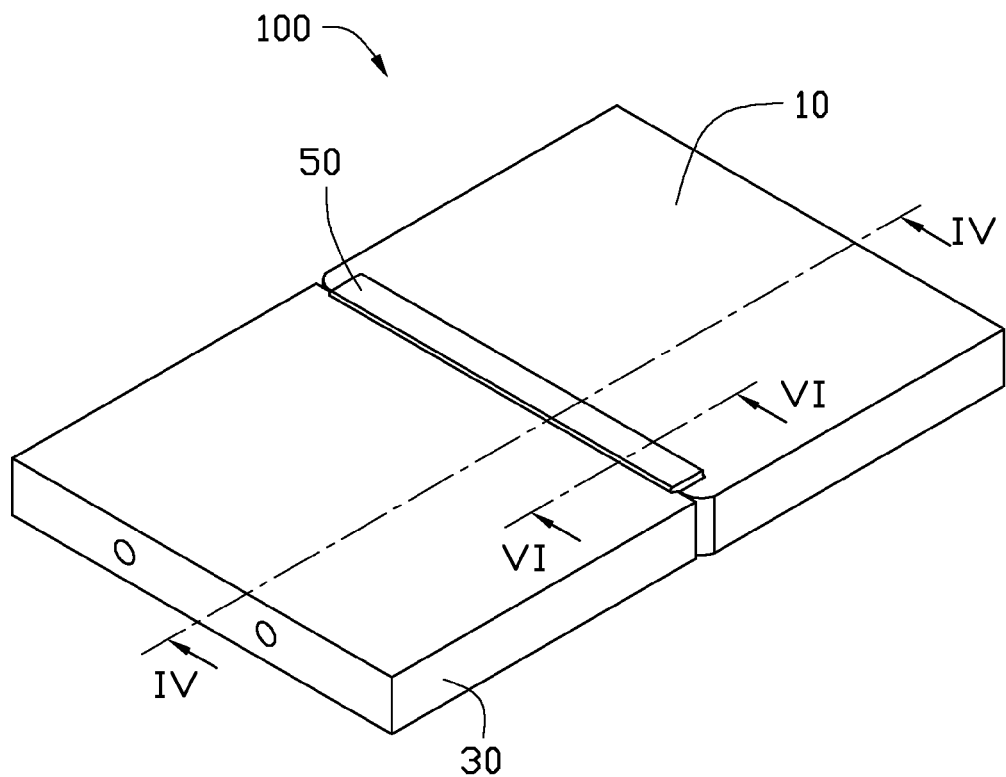
FIG. 1 is a schematic, isometric view of an optical fiber connector including a first transmission member and an optical transceiver, according to an exemplary embodiment.
Figure 2:
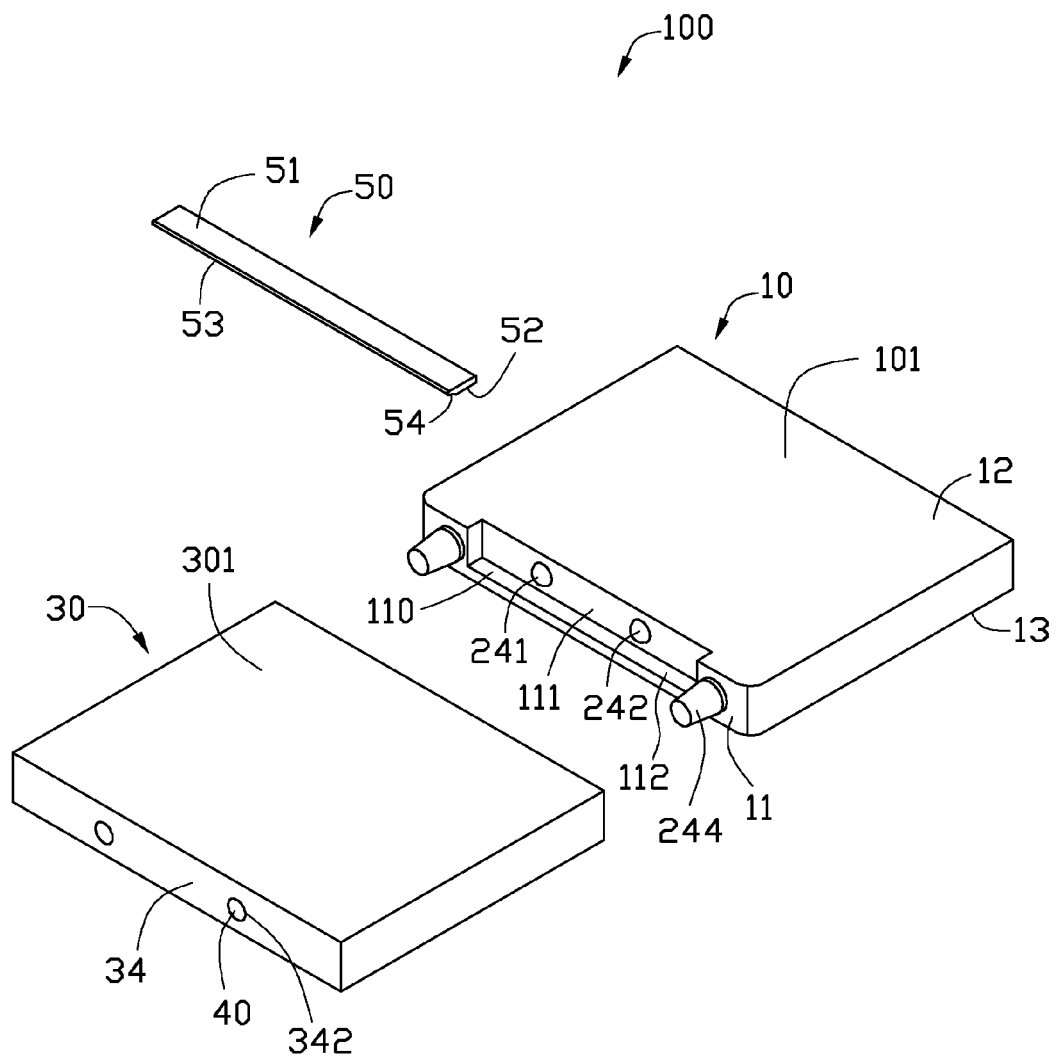
FIG. 2 is an exploded view of the optical fiber connector of FIG. 1.
Figure 3:
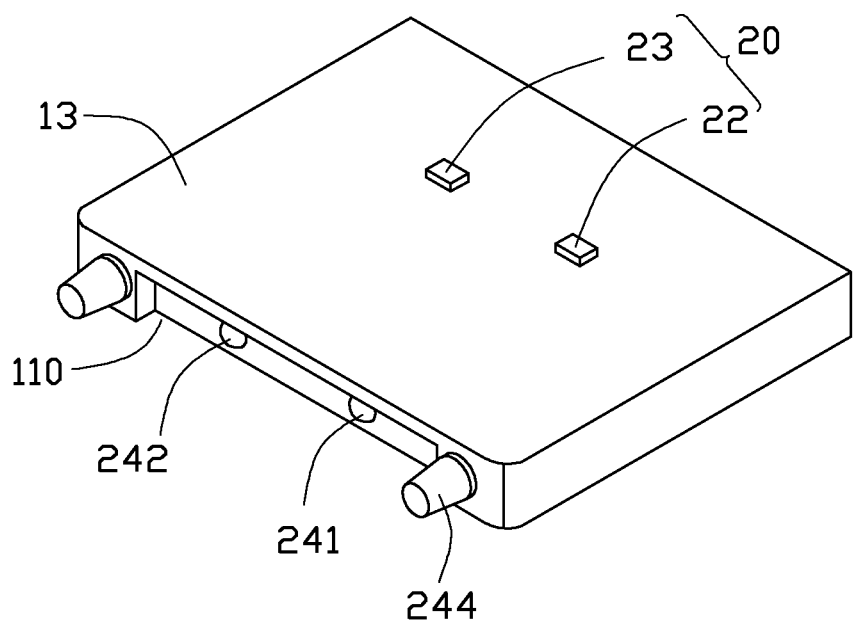
FIG. 3 is a schematic, isometric view of the first transmission member with the optical transceiver of FIG. 1.

FIGS. 1-3 illustrate an optical fiber connector 100 in accordance to an exemplary embodiment. The optical fiber connector 100 includes a first transmission member 10, an optical transceiver 20, a second transmission member 30, and a shielding member 50.

Figure 4:
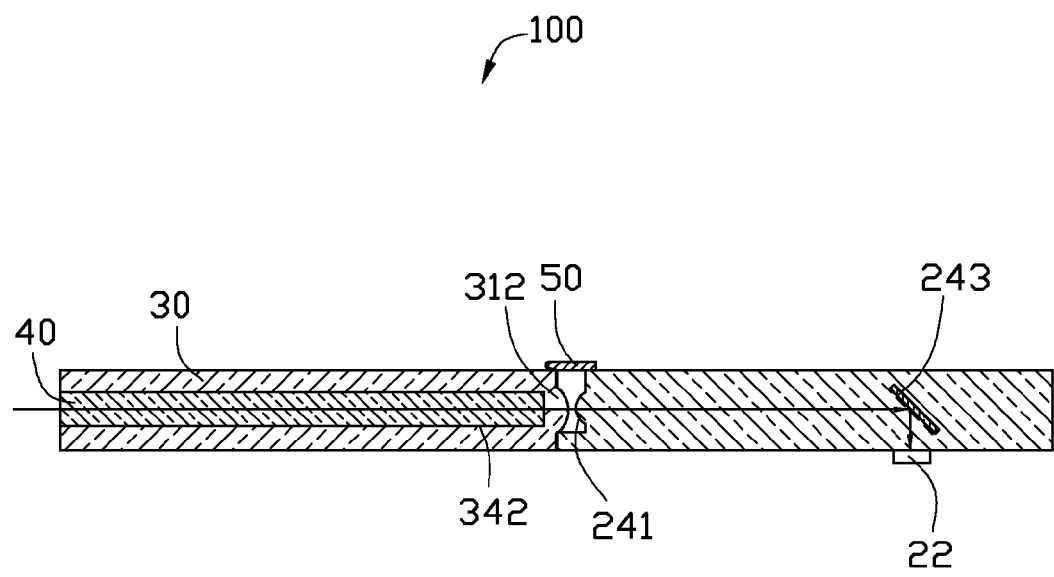
FIG. 4 is a sectional view of the optical fiber connector taken along the line IV-IV of FIG. 1.

Referring to FIGS. 2-4, the first transmission member 10 includes a first body 101, a first lens 241, a second lens 242, an elongated reflector 243, and two plugs 244.

The first body 101 is substantially a transparent cube and includes a front surface 11, an upper surface 12, and a lower surface 13. The upper surface 12 is substantially parallel to the lower surface 13. The front surface 11 perpendicularly connects the upper surface 12 to the lower surface 13. A recess 110 is defined in the upper surface 12 and is exposed at the front surface 11. That is, the first body 101 has an open end toward the front surface 11. The first body 101 includes a first light coupling surface 111 and a sealing surface 112 in the recess 110. The first light coupling surface 111 is substantially parallel to the front surface 11. The sealing surface 112 perpendicularly extends from the first light coupling surface 111. The first lens 241 and the second lens 242 are formed on the first light coupling surface 111 and are apart from each other. The reflector 243 is embedded in the first body 101. The longitudinal direction of the reflector 243 is substantially parallel to the longitudinal direction of the first light coupling surface 111. The plugs 244 perpendicularly extend from the front surface 11 and are apart from each other. In this embodiment, the plugs 244 are symmetrical to each other relative to the recess 110. The first lens 241, the second lens 242, the plugs 244, and the first body 101 are formed into a unitary piece.

The optical transceiver 20 is positioned on the lower surface 13 and faces the reflector 243. The optical transceiver 20 includes a light emitting unit 22 and a light receiving unit 23 apart from the light emitting unit 22. In this embodiment, the light emitting unit 22 is a vertical cavity surface emitting laser diode (VCSEL) and is configured for emitting an optical signal. The light receiving unit 23 is a photo diode and is configured for receiving an optical signal.

Figure 5:
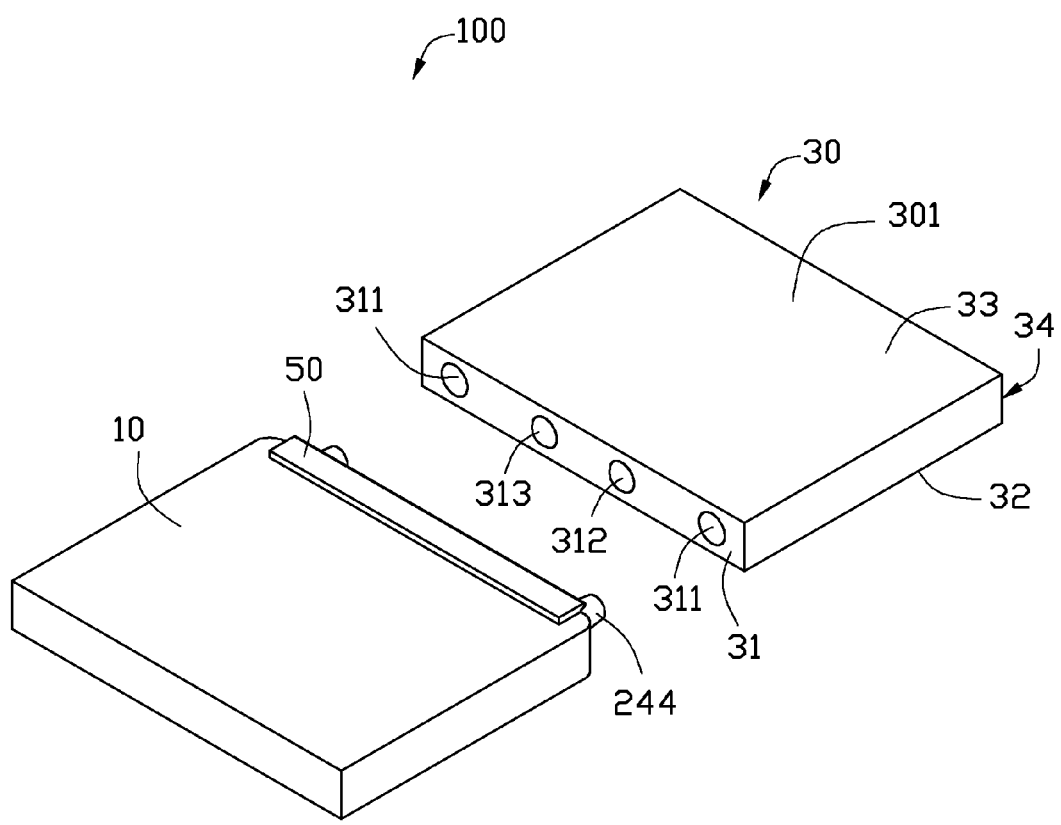
FIG. 5 is similar to FIG. 2, but viewed from another angle.
Figure 6:
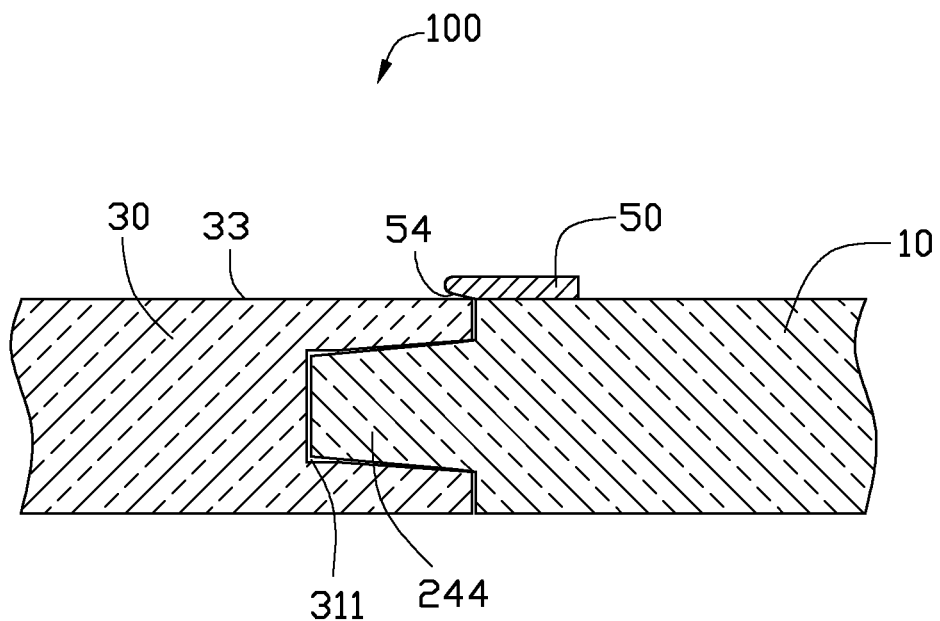
FIG. 6 is a sectional view of the optical fiber connector taken along the line VI-VI of FIG. 1.

Referring to FIGS. 4-6, the second transmission member 30 includes a second body 301, a third lens 312, a fourth lens 313, and two optical fibers 40.

The second body 301 is substantially a transparent cube and includes a second light coupling surface 31, a bottom surface 32, a top surface 33, and a rear surface 34. The second light coupling surface 31 faces the first light coupling surface 111 and is substantially parallel to the rear surface 34. The bottom surface 32 is substantially parallel to the top surface 33. The bottom surface 32 perpendicularly connects the second light coupling surface 31 to the rear surface 34. The top surface 33 perpendicularly connects the second light coupling surface 31 to the rear surface 34. Two engaging holes 311 are defined in the second light coupling surface 31 corresponding to the two plugs 244. The third lens 312 and the fourth lens 313 are formed on the second light coupling surface 31 corresponding to the first lens 241 and the second lens 242. Two blind holes 342 are defined in the rear surface 34. The blind holes 342 are parallel to each other and are aligned with the third lens 312 and the fourth lens 313. The optical fibers 40 are received in the blind holes 342 and are aligned with the third lens 312 and the fourth lens 313. In this embodiment, the third lens 312, the fourth lens 313, and the second body 301 are formed into a unitary piece.

Referring to FIGS. 2 and 5-6, the shielding member 50 is fixed on the upper surface 12 above the recess 110. In this embodiment, the shielding member 50 is adhered to the upper surface 12 with adhesive and faces the sealing surface 112. The shielding member 50 is substantially an elongated plate and includes a first horizontal surface 51, a second horizontal surface 52, an arc-shaped connecting surface 53, and a slanted surface 54. The first horizontal surface 51 is substantially parallel to and opposite to the second horizontal surface 52. The connecting surface 53 and the slanted surface 54 are arranged between the first horizontal surface 51 and the second horizontal surface 52. The connecting surface 53 connects the first horizontal surface 51 to the slanted surface 54. The slanted surface 54 is obliquely connected to the second horizontal surface 52. The width of the first horizontal surface 51 is larger than that of the second horizontal surface 52. That is, an included angle between the second horizontal surface 52 and the slanted surface 54 is an obtuse angle.

In assembly, the plugs 244 engage in the engaging holes 311 so that the first transmission member 10 is connected to the second transmission member 30. In this situation, the front surface 11 abuts the second light coupling surface 31. The upper surface 12 is coplanar with the top surface 33. The first lens 241 aligns with the third lens 312. The second lens 242 aligns with the fourth lens 313. The shielding member 50 cooperates with the sealing surface 112, the first light coupling surface 111, and the second light coupling surface 31 form a sealed room for receiving the first lens 241, the second lens 242, the third lens 312, and the fourth lens 313. Therefore, the four lenses 241, 242, 312, 313 are not exposed at an external environment and are not easily broken or contaminated. This increases transmission efficiency and ensures the signal integrity.

In use, when the optical fiber connector 100 is used as an optical emitting terminal, an optical signal emitted from the light emitting unit 22 is reflected by the reflector 243, and then passes through the first lens 241, the third lens 312, the corresponding optical fiber 40, and finally reaches another optical fiber connector (not shown). When the optical fiber connector 100 is used as an optical receiving terminal, an optical signal from another optical fiber connector (not shown) passes through the corresponding optical fiber 40, the fourth lens 313, and the second lens 242, and is then reflected by the reflector 243, and finally received by the light receiving unit 23.

In another embodiment, when the optical fiber connector 100 is assembled, the first lens 241 aligns with the third lens 312. The second lens 242 aligns with the fourth lens 313. However, the top surface 33 is raised relative to the upper surface 12. The top surface 33 abuts the slanted surface 54. The distance between the first light coupling surface 111 and the optical fibers 40 can be adjusted by changing the included angle between the slanted surface 54 and the second horizontal surface 52. In other embodiments, the third lens 312 and the fourth lens 313 may be omitted, thus the light path is shortened and the transmission efficiency is further improved.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An optical fiber connector comprising:
   a first transmission member comprising a first body, a first lens, and a second lens, the first body comprising a front surface, an upper surface, and a lower surface parallel to the upper surface, the front surface perpendicularly connecting the upper surface to the lower surface, a recess defined in the upper surface and being exposed at the front surface, the first body comprising a first light coupling surface and a sealing surface in the recess, the first light coupling surface being parallel to the front surface, the first lens and the second lens formed on the first light coupling surface, the sealing surface perpendicularly extending from the first light coupling surface;
   a second transmission member mechanically engaged with the first transmission member, the second transmission member comprising a second body, the second body comprising a second light coupling surface facing the first light coupling surface; and
   an elongated shielding member fixed on the upper surface above the recess, the shielding member cooperating with the first light coupling surface, the second light coupling surface, and the sealing surface to form a sealed room receiving the first lens and the second lens.

2. The optical fiber connector as claimed in claim 1, wherein the shielding member comprises a first horizontal surface, a second horizontal surface opposite to and parallel to the first horizontal surface, an arc-shaped connecting surface, and a slanted surface, the second horizontal surface contact the upper surface, the connecting surface and the slanted surface are arranged between the first horizontal surface and the second horizontal surface, the connecting surface connects the first horizontal surface to the slanted surface, the slanted surface is obliquely connected to the second horizontal surface, the width of the first horizontal surface is large than that of the second horizontal surface.

3. The optical fiber connector as claimed in claim 2, wherein the second body further comprises a top surface and a bottom surface parallel to the top surface, the second light coupling surface perpendicularly connect the top surface to the bottom surface.

4. The optical fiber connector as claimed in claim 3, wherein the top surface is coplanar with the upper surface.

5. The optical fiber connector as claimed in claim 3, wherein the top surface is raised relative to the upper surface, and the top surface abuts the slanted surface.

6. The optical fiber connector as claimed in claim 3, wherein the second transmission member further comprises two optical fibers received in the second body, and the optical fibers are respectively aligned with the first lens and the second lens.

7. The optical fiber connector as claimed in claim 6, wherein the second transmission member further comprises a third lens and a fourth lens, the third lens and the fourth lens are formed on the second light coupling surface and aligned with the corresponding optical fibers.

8. The optical fiber connector as claimed in claim 3, wherein two engaging holes are defined in the second light coupling surface, the first transmission member further comprises two plugs, and the plugs engage in the respective engaging holes.

9. The optical fiber connector as claimed in claim 7, further comprising a reflector received in the first body, wherein the first transmission member further comprises an optical transceiver having a light emitting unit and a light receiving unit, the light emitting unit and the light receiving unit are arranged on the lower surface facing the reflector.

10. The optical fiber connector as claimed in claim 7, wherein the second body, the third lens, and the fourth lens are formed into a unitary piece.

11. The optical fiber connector as claimed in claim 8, wherein the first body, the first lens, the second lens, and the plugs are formed into a unitary piece.

* * * * *